United States Patent [19]

Deschenes

[11] 3,714,631

[45] Jan. 30, 1973

[54] CHARACTER RECOGNITION METHOD AND SYSTEM

[75] Inventor: Raymond J. Deschenes, Atlanta, Ga.

[73] Assignee: Data Card Corporation, Minneapolis, Minn.

[22] Filed: March 26, 1971

[21] Appl. No.: 128,387

[52] U.S. Cl. ..................340/146.3 WD, 235/61.11 R

[51] Int. Cl. ..............................................G06r 9/18

[58] Field of Search...340/146.3 Z, 146.3 R, 146.3 S, 340/146.3 AH, 146.3 K, 146.3 WD, 146.3 C; 235/61.11 C

[56] References Cited

UNITED STATES PATENTS 3,262,099 7/1966 Skiko et al. ....................340/146.3 R
3,299,298 1/1967 Schinner........................235/61.11 C
3,542,979 11/1970 Collier..........................235/61.11 C
3,453,419 7/1969 Torrey ...........................340/146.3 Z
3,531,770 9/1970 Mauch et al. ...................340/146.2 J
3,293,604 12/1966 Klein et al......................340/146.3 J

*Primary Examiner*—Thomas A. Robinson
*Attorney*—Brufsky, Staas, Breiner & Halsey

[57] ABSTRACT

A character recognition method and system performs dynamic analysis of information derived in scanning characters for character identification. A linear array of plural sensors scans characters to be recognized in a corresponding plurality of horizontal scan paths. Each sensor produces an output responsive to and identifying the presence or absence of a character segment in its corresponding scan path. One or more successive sets of conditions result in scanning of each character in accordance with a change in the output condition of any sensor. At least selected sets of conditions are decoded to define corresponding states. The states derived in scanning a character are processed by logic means in accordance with the sequence of their occurrence for identification of the scanned character.

27 Claims, 11 Drawing Figures

| | SETS OF CONDITIONS | | | | | STATES | | | | |
|---|---|---|---|---|---|---|---|---|---|---|
| CHARACTERS | 1 | 2 | 3 | 4 | 5 | 1 | 2 | 3 | 4 | 5 |
| 0 | $ABCDE$ | $A\bar{B}\bar{C}\bar{D}E$ | $ABCDE$ | — | — | X | M | X | — | — |
| 1 | $\bar{A}\bar{B}\bar{C}\bar{D}E$ | $A\bar{B}\bar{C}\bar{D}E$ | $ABCDE$ | $\bar{A}\bar{B}\bar{C}\bar{D}E$ | — | K | NOT USED | X | K | — |
| 2 | $A\bar{B}CDE$ | $A\bar{B}C\bar{D}E$ | $ABC\bar{D}E$ | — | — | T | P | S | — | — |
| 3 | $A\bar{B}\bar{C}\bar{D}E$ | $A\bar{B}C\bar{D}E$ | $ABCDE$ | — | — | NOT USED | P | X | — | — |
| 4 | $ABC\bar{D}\bar{E}$ | $\bar{A}\bar{B}C\bar{D}\bar{E}$ | $ABCDE$ | $\bar{A}\bar{B}C\bar{D}\bar{E}$ | — | Q | J | X | — | — |
| 5 | $ABC\bar{D}E$ | $A\bar{B}C\bar{D}E$ | $A\bar{B}CDE$ | — | — | S | P | T | — | — |
| 6 | $ABCDE$ | $\bar{A}\bar{B}C\bar{D}E$ | $\bar{A}\bar{B}CDE$ | — | — | X | N | R | — | — |
| 7 | $A\bar{B}\bar{C}\bar{D}\bar{E}$ | $ABCDE$ | — | — | — | I | X | — | — | 7 |
| 8 | $AB\bar{C}DE$ | $ABCDE$ | $A\bar{B}C\bar{D}E$ | $ABCDE$ | $AB\bar{C}DE$ | NOT USED | X | P | X | NOT USED |
| 9 | $ABC\bar{D}\bar{E}$ | $A\bar{B}C\bar{D}\bar{E}$ | $ABCDE$ | — | — | Q | L | X | — | — |
| SPACE | $\bar{A}\bar{B}\bar{C}\bar{D}\bar{E}$ | | | | | U | | | | |

Patented Jan. 30, 1973 3,714,631

5 Sheets-Sheet 1

INVENTORS
RAYMOND J. DESCHENES

BY Burfsky, Stoos.
Greiner & Halsey
ATTORNEYS

| CHARACTERS | SETS OF CONDITIONS 1 | 2 | 3 | 4 | 5 | STATES 1 | 2 | 3 | 4 | 5 |
|---|---|---|---|---|---|---|---|---|---|---|
| 0 | $ABCDE$ | $A\bar{B}\bar{C}\bar{D}E$ | $ABCDE$ | — | — | X | M | X | — | — |
| 1 | $\bar{A}\bar{B}\bar{C}\bar{D}E$ | $A\bar{B}\bar{C}\bar{D}E$ | $ABCDE$ | $\bar{A}\bar{B}\bar{C}\bar{D}E$ | — | K | NOT USED | X | K | — |
| 2 | $A\bar{B}CDE$ | $A\bar{B}C\bar{D}E$ | $ABC\bar{D}E$ | — | — | T | P | S | — | — |
| 3 | $A\bar{B}\bar{C}\bar{D}E$ | $A\bar{B}C\bar{D}E$ | $ABCDE$ | — | — | NOT USED | P | X | — | — |
| 4 | $ABC\bar{D}\bar{E}$ | $\bar{A}\bar{B}C\bar{D}\bar{E}$ | $ABCDE$ | $\bar{A}\bar{B}C\bar{D}\bar{E}$ | — | Q | J | X | — | — |
| 5 | $ABC\bar{D}E$ | $A\bar{B}C\bar{D}E$ | $A\bar{B}CDE$ | — | — | S | P | T | — | — |
| 6 | $ABCDE$ | $\bar{A}\bar{B}C\bar{D}E$ | $\bar{A}\bar{B}CDE$ | — | — | X | N | R | — | — |
| 7 | $A\bar{B}\bar{C}\bar{D}\bar{E}$ | $ABCDE$ | — | — | — | I | X | — | — | — |
| 8 | $AB\bar{C}DE$ | $ABCDE$ | $A\bar{B}C\bar{D}E$ | $ABCDE$ | $AB\bar{C}DE$ | NOT USED | X | P | X | NOT USED |
| 9 | $ABC\bar{D}\bar{E}$ | $A\bar{B}C\bar{D}\bar{E}$ | $ABCDE$ | — | — | Q | L | X | — | — |
| SPACE | $\bar{A}\bar{B}\bar{C}\bar{D}\bar{E}$ | | | | | U | | | | |

FIG. 3

Patented Jan. 30, 1973

3,714,631

5 Sheets-Sheet 3

CHARACTER RECOGNITION METHOD AND SYSTEM

BACKGROUND OF THE INVENTION

1. Field of the Invention

This invention relates to character recognition methods and systems and, more particularly, to a method and system wherein character information derived in scanning a character is dynamically analyzed by decoding and logic circuitry for identification of the scanned character.

2. State of the Prior Art

Numerous systems and methods have been proposed heretofore for the automated recognition of characters of both machine readable and visually recognizable types. Many prior art systems require obtaining data relating to the entire configuration of an unknown character which is stored and subsequently processed for ultimate identification of the character. For example, some prior art systems provide for optically projecting an image of the unknown character onto a mosaic, or matrix array, of sensing devices such as photocells. The output of the array of sensors is then compared with a plurality of matrices corresponding to known characters and each having stored therein a recognition pattern. A match between the output of the sensor array, responsive to the image of the unknown character, and the stored information of one of the matrices then provides character recognition. Such techniques require accurate alignment of the image of the unknown character on the sensor array if recognition is to be achieved. Various shadow mask comparison techniques are also known which operate on a similar principle.

Another technique that has been proposed heretofore is that of curve tracing, such as with a flying spot scanner cathode ray tube which operates essentially to trace the configuration of the character. Data relating to line lengths, curves or discontinuities, e.g., angles and intersections and the like in the scanned character, is derived and compared with stored, similarly derived, data for known characters for identification.

Various complex digital processing techniques also have been proposed for performing a closely analogous function. In these, a plurality of scanning elements which may be disposed, for example, in a linear array, are caused to scan an unknown character in a predetermined direction. The outputs of the elements are gated into various storage registers as the scan proceeds, in accordance with predetermined time intervals. Such systems require complex processing circuitry for comparing signals from the various scanning elements with one another to identify continuous or discontinuous lines and intersections and the like.

Another technique proposed heretofore in the art is that of scanning the unknown characters, such as with a linear array of scanning elements, and simply counting certain predetermined events or characteristics which occur during the scan, for example, each time a line of scan intersects a segment of the character. Some such systems distinguish between intersections of long duration and ones of shorter duration and define corresponding, separate counts. The counts thus accumulated may simply be compared with stored such signals corresponding to known characters for achieving the identification, or recognition, of the unknown character. Alternatively, the counts may be subjected to further processing, or utilized as a control function such as in generating a digital pulse train, which then is further processed for ultimate analysis or comparison operations in achieving character recognition.

The prior art systems heretofore have all suffered from one or more of various defects. Many systems are exceedingly complex and correspondingly excessively expensive, while others, less complex and less expensive, afford inadequate reliability. Most systems require precise timing and synchronized control to establish scanning intervals in deriving character information for analysis. This requires transporting the medium in which the characters are presented through a scanning or sensing station at a precisely controlled speed for achieving adequate and reliable sensing of data from the scanned character. Many such systems furthermore require that the characters be of precise widths and that the characters be precisely spaced apart. Still other systems require that the boundaries of each unknown character first be determined before the scanning and recognition operations are initiated. Such requirements of course reduce the versatility of such systems, and the accuracy of recognition. These and other defects of prior art systems are overcome by the method and apparatus of the present invention.

SUMMARY OF THE INVENTION

In accordance with the invention, a linear array of plural sensing elements, or sensors, is caused to scan the characters to be recognized along q corresponding plurality of horizontal scan lines. Each sensor produces output signals identifying the presence or absence of a character segment in its corresponding scan path. A first set of output conditions for the plurality of sensors is defined when the output condition of any thereof identifies the presence of a character segment in its scan path. A successive set of such conditions is defined for each successive occurrence of a change in the output condition of any of the sensors. Thus, as each sensor of the plurality thereof responds to a new condition, i.e., either in making a transition from sensing background to sensing of a segment of the unknown character, or vice versa, the change in the condition of that one sensor or of one or more sensors simultaneously, thus defines a new set of conditions as occurring in the scan of the character. Each such set of conditions defines a corresponding state. The successive sets of conditions resultant from scanning of the character thus define successive states.

In the apparatus of the system, logic decoding gates respond to the outputs of the sensors to define corresponding states in accordance with preselected sets of conditions. It is significant to note that no arbitrary timing intervals are imposed in effecting scanning or deriving the sets of conditions; rather, the character configuration itself defines the changes of the conditions and thus defines the new sets thereof and the corresponding sequence of states and state changes. Further, logic recognition means respond to the outputs of the decoders for processing the thus defined states in the sequence in which they occur, and thereby immediately provide an output identifying the unknown character as one of a group of known characters which the system is designed to recognize.

Various sets of conditions may result in scanning a given character, depending upon the character, its font style, and the number of sensors employed. A large number of such sensing conditions may thus be defined, although a relatively small number is adequate to provide highly reliable character recognition in accordance with the present invention. In practice, a limited number of the sets of sensing conditions is usually employed out of the total available. This is done not only to reduce the amount of processing circuitry employed, but also for eliminating any sets of conditions in which uncertainties may exist as the result of the mechanics of the sensing or scanning apparatus and/or the specific character configurations. Decoders are thus provided for the selected sets of conditions to establish the various states employed in the recognition processing.

It is significant to note that the selection of sets of conditions need not be of sets which are unique to each of the plurality of characters to be recognized but, in fact, the same set or sets may be employed more than once for a given character, or for two or more different characters. This is permitted, since the logic recognition circuits require not only predetermined combinations of states to occur for recognition of the characters, but also that these states occur in a predetermined sequence.

As is apparent from the foregoing, the decoding functions and the logic recognition processing proceed substantially simultaneously with the sensing of the corresponding sets of conditions. As a result, recognition is achieved substantially concurrently with the completion of scanning a character. The dynamic analysis of the scanned character information furthermore reduces data storage provisions as required in prior art systems, reducing complexity and cost of the system.

Accordingly, the method and apparatus of the invention are greatly simplified in comparison to the prior art, yet provide highly reliable and rapid automatic character recognition.

BRIEF DESCRIPTION OF THE DRAWINGS

FIG. 3 comprises a first table indicating, for each of the characters of FIG. 1 and the sensor output conditions derived therefrom as presented in FIG. 2, the sets of conditions resultant from the scanning, assuming the scanning to proceed from left to right or, alternatively, the characters to be moved from right to left while the scan means is held in a stationary position, and a second table indicating the states corresponding to the sets of conditions of the first table, and the sequence in which the states must occur to identify the corresponding characters;

DETAILED DESCRIPTION OF THE INVENTION

Figure 1:
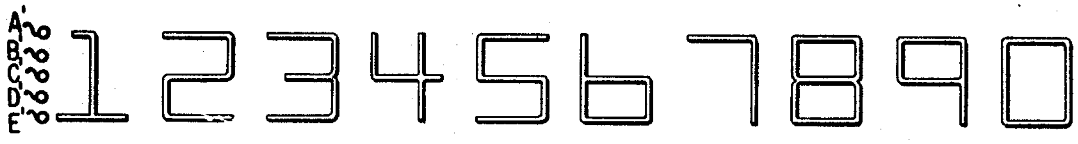
FIG. 1 is a representation of characters to be read by a system and method in accordance with the invention and includes a representation of the scan line or scan positions of a plurality of scanning elements or sensors, utilized to convert the character images into sensing signals.

The invention is discussed herein in relation to recognizing characters which are presented in FIG. 1 in a manner corresponding to the well-known Farrington 7B font. These characters are essentially of the match stick variety and are comprised of essentially seven straight line portions or match sticks. These seven portions comprise upper, lower, and middle horizontal sticks, upper and lower left, and upper and lower right vertical sticks. In general, reference to the numeral, or character, 8 illustrates the totality of the seven line segment font. For ease of visual recognition, however, various contouring effects are presented in the character configuration for closer resemblance to conventional characters. For example, the corners are rounded a bit and a "waist" is provided at the junction of the vertical segments and both ends of the horizontal segment of the numeral 8. Other similar modifications are apparent in the other numerals. Notably, 1 has a small flag extending to the left, as to the numeral 3, the horizontal bar is foreshortened and a "waist" effect and rounding of corners provided, and as to the numeral 4, the continuous vertical line formed by the upper and lower right vertical segments is shifted to the left for more conventional appearance and to assist in distinguishing a 4 from a 9, for example.

Figure 2:
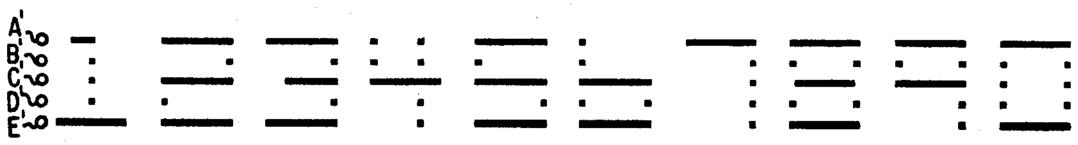
FIG. 2 is a diagrammatic representation of the sensing or output signals of the sensors employed in the scanning operation represented in FIG. 1, the heavy lines defining the character segments lying in the scan paths of the sensors.

These variations from a precise seven line segment font in the illustrative set of characters of FIGS. 1 and 2 are noted since they do present difficulties of recognition, particularly in prior art apparatus. In the recognition method and apparatus of the invention, however, these variations are processed without any difficulty and present no factor of unreliability in the recognition operations. From the foregoing and the following detailed description of the invention, however, it will be apparent that characters of other fonts, and not limited to numeric but including alpha numeric characters as well, can be recognized by the system of the invention. For purposes of present discussion, however, the invention will be described in the context of recognizing the numeral characters of the font illustrated in FIG. 1.

FIG. 1 also includes a schematic representation of five scanning elements, or sensors, and their respectively associated horizontal scanning paths, the elements being identified by the letters A', B', C', D', and E'. In FIG. 2, there is illustrated the response of the five scanning elements to the scanning of these characters. It is assumed that the characters are of equal height and the vertical displacement of the scanning elements A' and E', and thus their associated scan paths, correspond thereto. It is also assumed that the middle scanning element C' and its associated scan path corresponds with the middle horizontal stick or line segment of the specified font style. The outputs or responses of the scanning elements A' through E', assuming relative horizontal movement of these elements and the characters to be recognized, are thus illustrated by heavy dark lines corresponding to the intersection or coincidence of the respective scan paths of those elements and the segments or portions of the characters.

FIG. 3 comprises two tables, the first entitled "Sets of Conditions" and the second entitled "States." In general, in accordance with the invention, a set of conditions comprises, or is defined to mean, a specific combination of output conditions of the plurality of sensing elements A' through E' encountered in scanning each character of a class. Here, the set of characters comprises the numerals 1 through 9 and 0. Differing numbers of sets of conditions are derived in the scanning of these various numerals, the maximum being five such sets for the numeral 8 and the minimum being two such sets for the numeral 7.

In the table entitled "Sets of Conditions" in FIG. 3, the letters A through E are utilized in a conventional Boolean algebra sense to correspond to the conditions of the sensing elements A' and E' encountered in effecting their respective scans as illustrated and discussed in relation to FIGS. 1 and 2. More particularly, the symbols A through E define the sensing of a character segment and thus correspond to the heavy line portions in FIG. 2. The symbols $\bar{A}$ through $\bar{E}$ correspond to the absence of scanning of character segments and thus to the locations in the respectively corresponding scan paths of the elements A' through E' in which the elements are not sensing a segment of a character.

The sets of conditions which obtain in scanning each of the characters 1–9 and 0 is thus set forth in FIG. 3 and may be compared directly with the scan indications in FIG. 2. It is important to note that the sets of conditions occur in a sequence uniquely related to and directly defined by the configuration of each character. That is, each set of conditions is established as a direct result of the scanning operation. Further, a new set is defined when the condition of any one or more of the scanning elements A' through E' changes.

For example, the numeral 1 defines three sets of conditions. The first set $\bar{A}\ \bar{B}\ \bar{C}\ \bar{D}\ E$ corresponds to the scanning element E' and no other scanning element detecting a portion of the unknown character and which, in reference to FIGS. 1 and 2, comprises the lower horizontal bar of the numeral 1. When the flag portion of the top of the numeral 1 is detected by the element A', a new set of conditions $A\ \bar{B}\ \bar{C}\ \bar{D}\ E$ obtains. Similarly, when the vertical bar is detected by elements B', C', and D' — which occurs simultaneously with the continuation of the sensing condition for elements A' and E', the set ABCDE obtains. Finally, only the condition E remains true after passing beyond the vertical line segments of the 1 and this, by itself, defines a further, and here, final set $\bar{A}\,\bar{B}\,\bar{C}\,\bar{D}\,E$.

Note particularly that the various sets of conditions are independent of the duration of these conditions and further that the recognition of these various sets relates entirely to the actual scanning of the configuration of the character and is not imposed by any arbitrary timing function. Further, assuming the same general relationship of the segments of each character, these identical states will obtain regardless of width variations, whether of a random or uniform nature with respect to the individual characters of the set.

In FIG. 3 there if further provided a table entitled "-States." In operation and as will be hereinafter explained, these states are derived by logic decoding of the output conditions of the plurality of sensors in accordance with the sets thereof as set forth in the table of Sets of Conditions. Each set of conditions defines a corresponding state, and like sets define like states. Note also that a new state results only when a new set of conditions obtains. Further, a given state may occur at different times in a given character, and for different characters. For example, for the numeral 0, the first and third states are both X. X also comprises the third state for the numerals 1, 3, 4, and 9 and the first state for the numeral 6, as well as the second state for the numerals 7 and 8.

A further set of conditions is also included in FIG. 3, corresponding to the absence of sensing of any portion of any character and thus to the location of the sensing elements preceding or following any character and intermediate any two characters. This is termed a space to distinguish from the character conditions, and corresponds to the condition $\bar{A}\ \bar{B}\ \bar{C}\ \bar{D}\ \bar{E}$. The space is processed by logic decoding means to define the state U. The state U is utilized for various purposes as hereinafter explained, for example, for identifying the completion of scanning of a character.

In relation to an earlier comment regarding the modifications in the configuration of the characters, consider the numeral 8. The numeral 8 defines identical first and fifth conditions, A B D E, C being absent due to the "waist." This assumes that the "waist" is detectable. Such an indentation in a practical application typically becomes clogged with dirt and is not reliably detectable. The manner for avoiding difficulties resulting therefrom is explained hereafter.

In the 7B font, only six items of information are required to uniquely identify each of the numerals 1–9 and 0. It is apparent from FIG. 3 that an amount of information well in excess of these minimal six items is afforded. Thus, substantial redundancy is available for reliability. This redundancy also permits elimination of states which may be uncertain. Thus, in the example above mentioned of the numeral 8, and the first and fifth states are not used since the remaining sequences of second, third, and fourth states XPX are more than sufficient to uniquely identify the numeral 8. Note that the sequence of states XMX identifying the character 0 distinguish from the selected sequence of states XPX for the numeral 8 by the different middle states thereof.

As will more fully appear hereinafter, the single distinction of the middle or second states for the characters 0 and 8 provide highly reliable and unique identification since the logic recognition circuits operate in a sequential manner. Recognition of the state X serves to establish that of the 10 characters capable of being recognized, only characters 0, 6, or 8 have a possibility of, or could result in, being recognized since only these have a first state X. A character such as 7 which has a second state X is immediately rejected as a possible recognition character as the result of this first logic step—i.e., when the first state is identified as X.

Upon the subsequent recognition of the state P, the possibility of either character 0 or 6 resulting is immediately rejected since their second states must be M or N if recognition is to obtain. In fact, at this point, the numeral 8 has already been uniquely identified since no other character has the sequence of first and second states X and P, respectively. Nevertheless, for further reliability, one more state, i.e., the fourth state X for the numeral 8, may also be required by the logic recognition circuitry to assure unique identification of the numeral 8.

As a further example of the recognition operation and the reliability of the system of the invention, consider the recognition of the numeral 3 as against the numeral 8. Here, the two states employed for recognition of the numeral 3 are P and X, and these are the same and of the same sequences as the last two states P and X used for recognition of the numeral 8. However, there is no possibility of the numeral 3 being recognized since it is not even selected as a possible character when a first state X is determined in scanning a character.

Figures 4, 5:
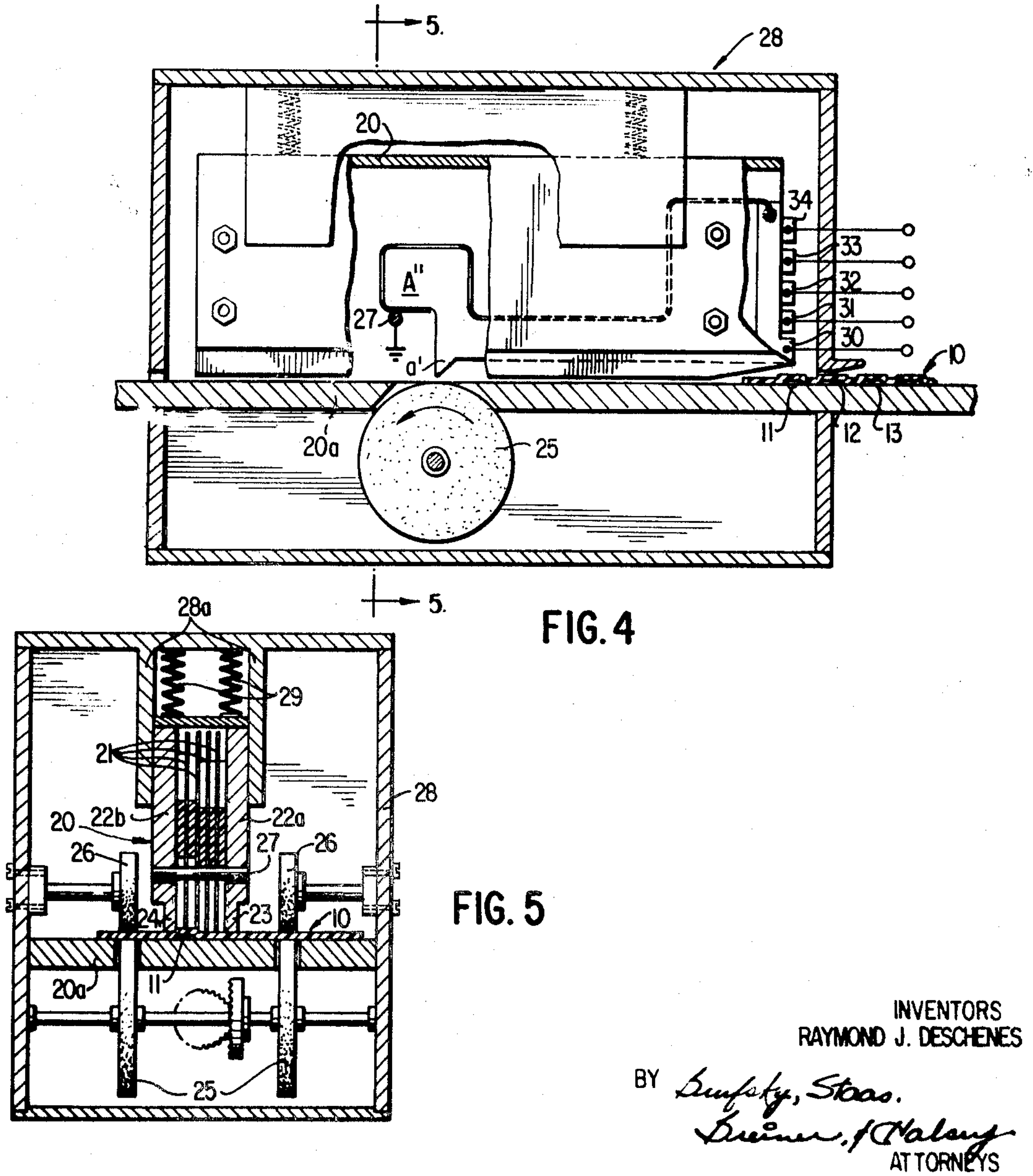
FIG. 4 is a planar view of a scan head suitable for use as the sensors employed in the present invention, and showing, in diagrammatic form, a character-bearing item to be advanced past the head for sensing of characters embossed thereon.
FIG. 5 is an end view of the read head of FIG. 4, additionally showing a drive mechanism for advancing the character-bearing item past the read head for sensing.

In FIG. 4 is illustrated a scanning head 20 suitable for use in the system of the invention and which comprises the separate invention of Allen Brock, as set forth and claimed in his application entitled "Electro-Mechanical Scan Head" filed concurrently herewith, Ser. No. 128,379, filed Mar. 26, 1972 and assigned to the common assignee. The scan head 20 of FIG. 4 is ideally suited for scanning embossed characters such as are typically employed today with credit cards. Such a card is illustrated at 10 in FIG. 4 and includes raised numerals shown diagrammatically at 11, 12, and 13.

The scanning elements of the head 20 comprise a plurality of flexible arms A'', B'', C'', D'', and E'' corresponding to the scan elements A' through E' of FIGS. 1 and 2. Each of the elements A'' through E'' includes a wiper such as a' illustrated for the foremost element A'' seen in FIG. 4. Preferably, the scan elements are separated by low friction, non-conductive spacer sheets 21 of a material such as Mylar to permit freedom of vertical motion between the various elements and electrical insulation therebetween. The elements are tacked in parallel side by side relationship with the elements in aligned position between two supporting walls 22 which, for example, is of a relatively thicker and sturdy transparent Mylar material. As best seen in FIG. 5, the support elements 22*a* and 22*b* respectively include downwardly extending flanges or undercut portions 23 and 24 which engage the opposite top and bottom edges of the embossed characters of the card, as illustrated (for one edge) by the character 11 situated therebetween in FIG. 5.

Preferably, the head 20 is received within a housing 28 in sliding engagement between downwardly extending flanges 28*a*. Resilient biasing means, shown as springs 29, urge the head toward the support surface 20*a* on which the card 10 is received. Transport or drive means schematically illustrated by drive wheels 25 and associated idler rollers 26 engage the card 10 to transport it past the head 20.

The inherent biasing of the resilient arms A'' through E'' cause them to normally engage the support rod 27. The rod 27 is of conductive material and is electrically connected to ground potential. Each of the elements A' through E' may be of conductive material or alternatively may include a conductive material on the edge thereof extending from the lower surface of the laterally extending portion which engages the rod 27 to corresponding output terminals 30 through 34. In operation, when the wiper of any element engages a character segment in its scan path, the element is raised, thereby breaking the electrical connection to the rod 27 and effecting a switching action to produce an electrical output signal.

Figures 6, 7:
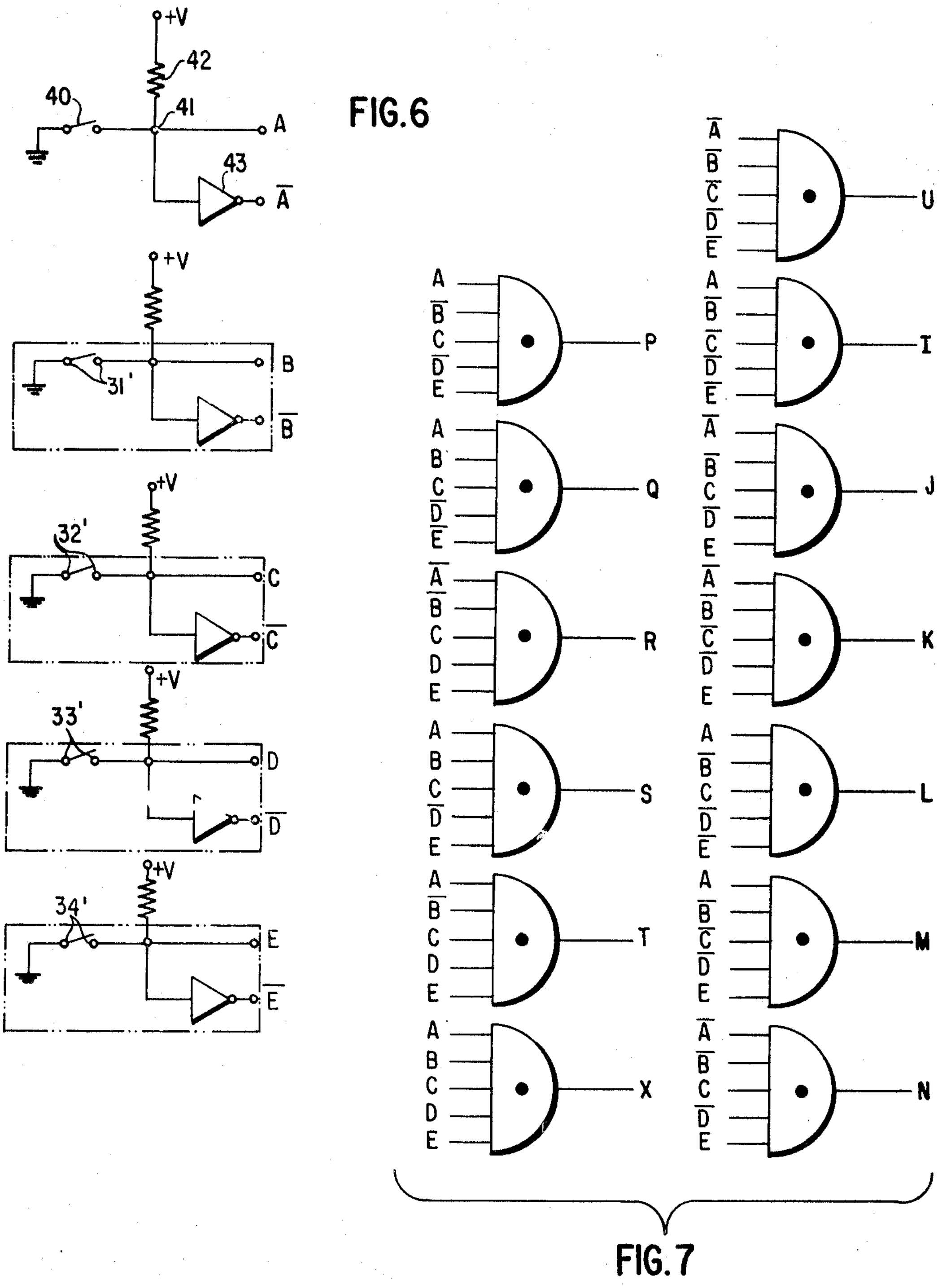
FIG. 6 shows a group of schematics of sensor elements comprising switching circuitry including switches corresponding to sensing elements of the type shown in FIGS. 4 and 5 and signal processing circuits associated with the outputs of the switches.
FIG. 7 shows a set of decoding logic gates for identifying states associated with selected sets of conditions derived in scanning characters.

In FIG. 6, there is shown a schematic of suitable switch circuitry utilized in providing electrical output signals indicating the sensing conditions A through E as well as the converse thereof, $\bar{A}$ through $\bar{E}$. Since each of these circuits may be identical, only the circuit for the output signals identifying the conditions A and $\bar{A}$ is shown.

The illustrative circuit includes a switch 40 connected at one terminal to ground and at the other terminal thereof to a junction 41, in turn connected through a resistor 42 to a positive potential source. Junction 41 is connected directly to an output terminal labelled A and through an inverter 43 to an output terminal labelled $\bar{A}$.

The switch 40 corresponds to the switching function of the switch element A'' in FIG. 4 and particularly the contact elements provided by the lower surface of the lateral arm *a''* and the contact rod 27, the latter being connected to ground. Switch 40 is normally closed, tying terminal 41 to ground and thus producing a zero or ground potential output.

Ground potential is defined as a logic "0." Inverter 43 inverts the ground potential output at junction 41 and produces a positive potential output at the terminal for condition $\bar{A}$. A positive potential defines a logic "1," or true, and thus indicates the condition $\bar{A}$ to be true. When the switch 40 opens, as when the element A'' is raised by engaging the embossed surface of a character, a positive potential appears at junction 41 corresponding to a logic "1" state, or a true condition for the output A and a false condition for the output $\bar{A}$.

It is apparent that any suitable technique for generation of the outputs in FIG. 6 may be employed. Thus, optical scanning techniques or any of a number of other scanning techniques may be employed to generate the noted outputs. The structure of FIGS. 4 and 5 is merely illustrative of one suitable scanning technique.

In FIG. 7 is shown a plurality of decoding gates responsive to the respectively corresponding ones of the sets of conditions as set forth in the table of FIG. 3. As before noted, certain sets of conditions are not utilized and thus decoding gates are provided only for those selected sets. In particular, a decoding gate is provided for each of the states listed in the table of states in FIG. 3, including a decoding gate for the state U. For example, the first set of conditions for the character 1 is listed in the table of FIG. 3 as simply E. As before noted, this corresponds to the set of conditions $\bar{A}$ $\bar{B}$ $\bar{C}$ $\bar{D}$ E. The corresponding state is identified as state K. In FIG. 7, the decoder which produces an output state K thus receives the inputs $\bar{A}$ $\bar{B}$ $\bar{C}$ $\bar{D}$ and E. The negation condition is, of course, of substantial informational content and thus is provided in the output of the switching circuitry in FIG. 6.

Figure 8:
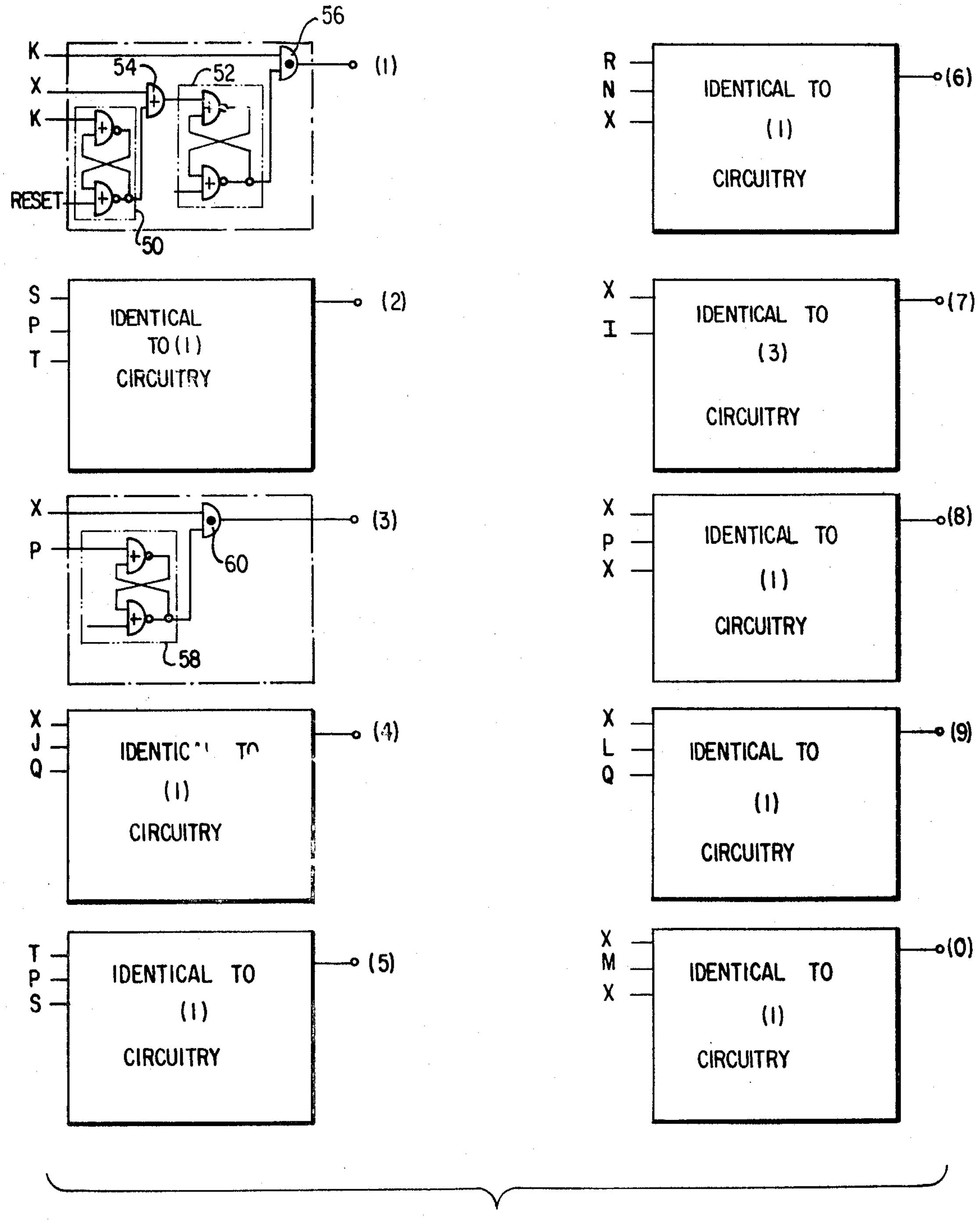
FIG. 8 shows logic diagrams of character recognition logic responsive to the state outputs of the decoders of FIG. 7 and which are individually operable to process logic states in a prescribed sequence as derived in scanning unknown characters for identifying the scanned character as one of a set of known characters.

In FIG. 8 is shown a plurality of character recognition logic circuits and particularly a logic circuit associated with each of the numerals which the system is designed to identify, here, the numerals 1 through 9 and 0. From the table of states in FIG. 3, it will be recalled that up to five sets of conditions and thus five corresponding sequential states can be derived for a single character. However, a maximum of only three states and in some instances, two, are used for recognition, as shown in the table of states.

The logic circuitry for the numeral 1 is an example of a three sequential state logic circuit. More specifically, the logic circuit for recognizing the numeral 1 includes first and second storage devices 50 and 52 and first and second AND gates 54 and 56. Again, recalling the state table of FIG. 3, the sequence of states KXK corresponding to the first, third, and fourth sets of conditions, as selected, identify the character 1. The first storage circuit 50 thus is set by a K input and produces a set output providing a first enable pulse to AND gate 54. If the state X is subsequently received, AND gate 54 is enabled and sets storage circuit 52, the latter at its set output producing a signal for enabling AND gate 56. When a subsequent K state is detected, AND gate 56 is enabled and an output signal is produced identifying the numeral 1. Note that the specified states, KXK, must be derived and must occur in that sequence to achieve identification.

The logic circuitry identifying the numeral 3 requires only two states to be identified and thus employs only a single storage circuit 58 and an associated AND gate 60. These elements respond to the sequence of state inputs P and X in a manner understood from the above description, to produce an output signal identifying the scanned character as the numeral 3.

As is indicated in FIG. 8, the logic circuitry for identifying numeral 7 is identical to that for the numeral 3, and the circuitry for the remainder of the numerals is identical to the three stage circuitry for the numeral 1. Each logic circuit, however, receives as inputs the states as defined in the table of FIG. 3 and as produced by the decoding circuits of FIG. 7.

Figure 9:
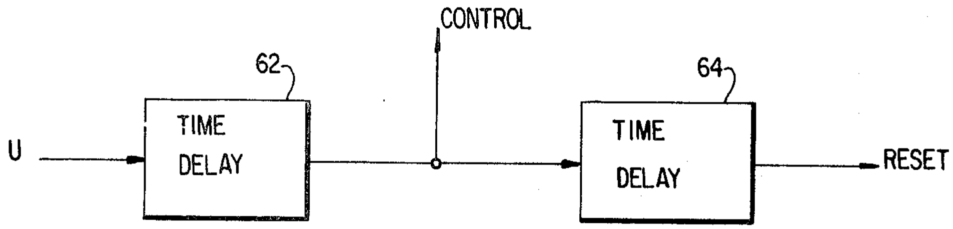
FIG. 9 shows a block diagram of control circuitry utilized in the system of the invention.

Upon completion of recognition of a character, it is apparent that all of the sensors will return to sensing a background level and thus the condition $\bar{A}$ $\bar{B}$ $\bar{C}$ $\bar{D}$ $\bar{E}$ will be obtained, resulting in the state U. The U state affords a convenient signal for synchronization and control functions. As shown in FIG. 9, the signal U is applied to two series connected time delay circuits 62 and 64, the output of the first circuit 62 providing a control signal and the output of the second delay circuit 64 providing a reset signal. The duration of the time delay of circuit 62 may be selected as desired to assure that the logic processing of the logic recognition gates of FIG. 8 is completed prior to generation of the control signal.

The time delayed control output derived from the U state signal and produced by delay circuit 62 may be utilized for a number of purposes. For example, temporary storage of the outputs identifying one or more scanned characters may be provided, such as a shift register or other suitable apparatus. The control output may provide for sequentially shifting a signal representative of a recognition signal through successive states as further characters are identified.

The further delayed reset pulse produced by time delay 64 is used to reset all of the character recognition logic. The time delay produced by time delay 64 assures that any transfer of data initiated by the control pulse has been completed before the temporary character storage elements are reset in preparation for recognition of the next succeeding character.

In accordance with the specific font style disclosed herein and in fact, with most font styles of the type designed for automated reading, all characters of a set are of the same height, and other character includes either a vertical line or a combination of vertical and horizontal line segments which define a continuous line through that height. As a result, every sensor must establish a true output condition in the course of scanning a character. In the event that one or more sensors does not, a malfunction has occurred and erroneous recognition results may obtain.

Figure 10:
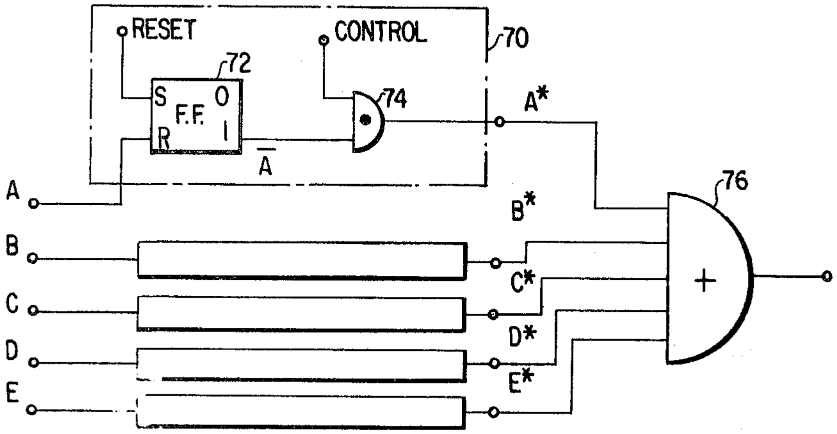
FIGS. 10 and 11 show logic block diagrams of error checking and alarm circuits in accordance with the system of the invention.

FIG. 10 shows a schematic block diagram of an error check circuit for detecting this type of error, and which may be readily implemented in the system of the invention. There are illustrated error check circuits respectively associated with the output conditions A, B, C, D, and E. Since the circuits may be identical, the circuit is shown in detail only for the condition A, as the circuit 70.

The error check circuit for the A condition includes a bistable flip-flop 72 and an AND gate 74, the bistable flip-flop 72 being switched to a set state and producing an output corresponding to the condition $\bar{A}$ in response to each reset pulse. Generation of the reset pulse was explained in relation to FIG. 9. The flip-flop output corresponding to $\bar{A}$ is applied as one input to AND gate 74, the other input comprising the control pulse.

In operation, at the conclusion of each recognition operation, the flip-flop 72 is set by the reset pulse; it will be recalled that the reset pulse is generated subsequently to the control pulse. If, during the course of scanning the next successive character, the condition A remains false, the flip-flop 72 will remain set. Following scanning of the character and when the U, or space state obtains, a shift pulse is generated whereby AND gate 74 is enabled, producing an error output signal A*. On the other hand, if the condition A becomes true at any time in the scanning of a character, flip-flop 72 is reset, the output condition $\bar{A}$ is then false, and AND gate 74 remains disabled. Each of the error outputs A* through E* may actuate corresponding alarm devices or these outputs may be supplied to OR gate 76 to generate a common alarm output.

Figure 11:
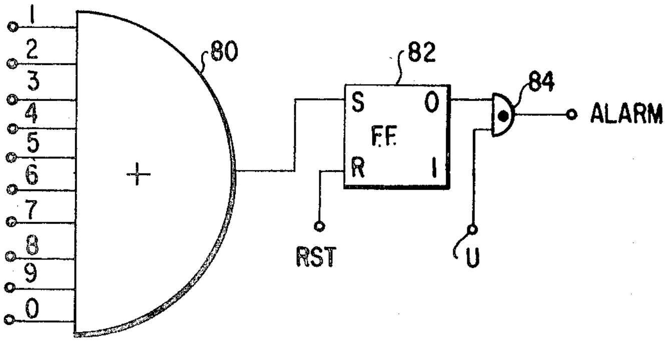

In FIG. 11 is shown a further alarm circuit which is also readily implemented in the system of the invention and establishes the requirement that a character must be recognized between successive pair of U states. In this context, it will be appreciated that reference to successive pairs of U states implies that a different intervening state has obtained.

In the alarm circuit of FIG. 11, OR gate 80 receives at its inputs the outputs of the logic recognition circuits of FIG. 8, and particularly signals identifying the recognized characters 1 through 9 and 0. The output of OR gate 80 is applied to one set input of a bistable flip-flop 82, the reset output of which is applied to one output of AND gate 82. The reset pulse generated by the circuit of FIG. 9 is applied to the reset input of flip-flop 82 and a signal corresponding to the establishment of the U state is applied to the second input of AND gate 82.

In operation, flip-flop 82 is reset by the reset pulse to provide a first enabling input to AND gate 84. Again, it will be recalled that the reset pulse is generated a time interval subsequent to the U state having first obtained. If sensor outputs are produced but no character is recognized, flip-flop 82 remains reset and upon the subsequent U state obtaining, AND gate 84 is enabled and an alarm output generated. If, however, a character is recognized, and thus one of the inputs 1 through 9 and 0 is true, flip-flop 82 is set by the output of OR gate 80 and AND gate 84 is disabled. Thus, upon the subsequent occurrence of a U state, AND gate 84 remains disabled and no alarm condition results.

Thus, it will be appreciated that the invention provides for dynamically analyzing the character information as it is derived in scanning a character. Particularly, the system responds to the states which are established by the occurrence of selected sets of conditions, and dynamically processes those states concurrently with, and in the sequence of their occurrence in the scanning of the character for effecting recognition. The sequential processing of the state information provides an inherent error check in that not merely the combination of states but also the sequence in which those states appear must be satisfied to achieve recognition. Further, upon occurrence of any state, the processing corresponding to the logic recognition gates immediately establishes the probability of recognition of only a limited number of the set of characters. By selection of the sets of conditions and accordingly defining the corresponding states, it will be appreciated that for at least certain of the characters the sequence of states required for recognition may in fact comprise but a single state upon the occurrence of which the character is immediately and uniquely identified. Thus, it is to be understood that reference to sequential processing of the states includes a sequence of a single state in those instances wherein that single state uniquely identifies a corresponding character. In most instances, however, a sequence of at least two states will typically be employed to provide further accuracy and reliability in the recognition operation.

Where a single state suffices for uniquely identifying a character of the set to be recognized, an identifying signal for that character is immediately produced. Where two or more states are employed for recognition, only upon receipt of the specified states in the required sequence is recognition accomplished and the identifying signal produced.

Further, it will be appreciated that the storage techniques employed in the invention provide for the dynamic processing of the states in accordance with required sequences for identification, rather than storage of character information or data as derived from scanning, which stored data is to be employed in a subsequent analysis operation.

In summary, the invention provides a method and system for high speed recognition of characters which is of greatly simplified form in comparison to prior art systems, but which is highly reliable and versatile in operation. The invention is ideally suited for recognizing characters of the type typically employed in embossed credit cards but is, of course, not limited thereto. It is apparent that various modifications may be made in the methods and structures described herein without departure from the scope of the invention. Accordingly, the invention is not to be considered limited by the description but only by the scope of the appended claims.

What is claimed is:

1. A method of character recognition wherein a character to be read is scanned along a plurality of scan paths by a corresponding plurality of sensors, each of which sensors is responsive to and produces output conditions identifying the presence or absence of a character segment in its corresponding scan path, comprising:

defining a space state in response to the set of output conditions of said plurality of sensors identifying the absence of character segments in all of the scan paths, defining for each character of a class to be recognized, an initial set of output conditions of said plurality of sensors upon the output condition of at least one of said sensors identifying the presence of a character segment in its corresponding scan path, and defining a successive set of output conditions of said plurality of sensors for each occurrence of a change in the output condition of any sensor from that of the next preceding set of conditions, in scanning that character, defining prescribed sequences of character recognition states uniquely identifying respectively corresponding characters of the class, each said sequence of states corresponding to at least a selected one of said initial and successive sets of output conditions defined in scanning the corresponding character, scanning a character with said plurality of sensors, responding to the output conditions of said sensors produced in scanning a character in accordance with said selected sets of output conditions to define corresponding states, and processing each successive state thus defined in scanning a character in accordance with the prescribed sequences of states for uniquely identifying the scanned character as one of the characters of the class to be recognized.

2. A method of character recognition as recited in claim 1 further comprising:

responding to a space state to distinguish between the scanning of successive characters.

3. A method of character recognition as recited in claim 1 wherein the processing of successive character recognition states defined in scanning a character comprises:

storing the first and each successive character recognition state defined in scanning a given character only in association with each of said prescribed sequences of character recognition states for which each preceding character recognition state of that sequence has been previously defined in the scanning of said given character and accordingly stored in association therewith, and achieving character identification upon receipt of a thus defined character recognition state satisfying the last character recognition state of a prescribed sequence for which each preceding character recognition state is satisfied.

4. A method of character recognition as recited in claim 3 further comprising:

clearing the storage of said character recognition state indications in response to receipt of said space.

5. A method of character recognition as recited in claim 4 wherein said storage is cleared a predetermined time interval subsequently to receipt of said space state.

6. A method of character recognition as recited in claim 1 for a class of characters wherein each character is of a height corresponding to the displacement of the uppermost and lowermost scan paths, further comprising:

responding individually to the output of each sensor to determine whether the output condition thereof identifies the presence of a character segment in its scan path during the scanning of each character, and identifying an error condition upon determining that for any sensor of said plurality thereof, such an output condition has not obtained throughout the scanning of a character.

7. A method of character recognition as recited in claim 1 further comprising:

recognizing an error condition when any of said sensors fails to produce an output condition identifying a character segment in its scan path between the occurrences of successive space states.

8. A method of character recognition as recited in claim 1 further comprising:

responding to the outputs of said sensors to identify the scanning of a character segment by any thereof, generating an error indication in response to receipt of a space state subsequent to receipt of an output condition of any sensor identifying a character segment in its path in the absence of successful identification of a character of the class to be recognized.

9. A method of character recognition as recited in claim 1 further comprising:

rejecting those sets of conditions which may introduce uncertainty in the sensing and processing operations and accordingly defining selected sets of conditions and corresponding prescribed sequences character recognition of states for identifying a character having any such rejected sets of conditions.

10. A method of character recognition wherein a character to be read is scanned along a plurality of scan paths by a corresponding plurality of sensors, each of which sensors is responsive to and produces output conditions identifying the presence or absence of a character segment in its corresponding scan path, comprising:

scanning a character to define a first set of conditions corresponding to the outputs of said plurality of sensors when the output of any thereof identifies the presence of a character segment in its scan path, and to define a successive such set of conditions for each successive occurrence of a change in the output condition of one of said sensors when the output of another of said sensors identifies the presence of a character segment in its scan path, defining a plurality of states respectively corresponding to at least selected ones of said sets of conditions, and dynamically analyzing the sensor outputs resultant from scanning a character in accordance with the selected sets of conditions by processing the said corresponding states in the sequence of the sensing of the sets of conditions, and in accordance with prescribed sequences of states preselected to uniquely identify each character of the class to be recognized.

11. A method of character recognition as recited in claim 10 further comprising:

defining a space state in response to the outputs of said plurality of sensors identifying the absence of any character segments in their corresponding scan lines, and responding to the occurrence of said space state to terminate the further processing of said states thereby to distinguish between successive characters.

12. A method as recited in claim 11 further comprising producing an output signal upon the identification of each scanned character for identifying that character, storing said output signal in storage means associated with the identified character, and responding to said space state for producing a control signal a predetermined time after the occurrence of said space state and prior to recognition of a successive character, and clearing said temporary storage means to enable storing of a signal identifying the next successively recognized character.

13. A character recognition system wherein a character to be read is scanned along a plurality of scan paths by a corresponding plurality of sensors, each of which sensors is responsive to and produces output conditions identifying the presence or absence of a character segment in its corresponding scan path, and wherein a change in the output condition of any sensor defines a new set of output conditions of said plurality of sensors, comprising:

means responsive to said plurality of sensors for defining character recognition states corresponding to selected sets of said output conditions of said sensors, and wherein at least one of said sensor output conditions of each selected set corresponds to the presence of a character segment in the sensor scan path, and means defining a space state in response to the set of output conditions of said plurality of sensors identifying the absence of character segments in all of the scan paths, and logic recognition means establishing a prescribed sequence of character recognition states identifying each character of a class to be recognized, said logic recognition means being responsive to said state defining means and processing the character recognition states defined by said state defining means in the succession in which the respectively corresponding sets of output conditions are produced during scanning of a character, and in accordance with said prescribed sequences of character recognition states, for identifying the scanned character.

14. A character recognition system as recited in claim 13 wherein:

said logic recognition means responds to a space state to distinguish between the scanning of successive characters.

15. A character recognition system as recited in claim 13 wherein:

said logic recognition means responds to a space state to terminate the processing of successive states derived in scanning each of a succession of characters.

16. A character recognition system as recited in claim 13 wherein said logic recognition means comprises:

a plurality of storage means respectively associated with corresponding ones of said character recognition state defining means to be set in response to receipt of a state defining output therefrom, and means for sequentially relating said storage means in groups corresponding to said prescribed sequences of character recognition states, and for enabling the setting of each storage means of a given group in succession, in response to receipt of a succession of states in said prescribed sequence for that group.

17. A character recognition system as recited in claim 16 wherein said sequential relating means comprises means responsive to the setting of a next preceding storage means of each group thereof for enabling setting of the next successive storage means of that group upon receipt of the respectively corresponding character recognition state from said state identifying means, and responsive to the setting of the last such storage means of any group thereof upon receipt of a state identifying output comprising the last state of that prescribed sequence, for producing an output signal uniquely identifying a character of the class as the character scanned.

18. A character recognition system as recited in claim 17 wherein there is provided at least one storage means for each of said prescribed sequences to be set by receipt, in the prescribed sequence, of the corresponding state for identifying the scanned characters.

19. A character recognition system as recited in claim 18 wherein there are provided at least two storage means for certain of said prescribed sequences, grouped by said relating means in accordance with said prescribed sequences to be set by receipt of the corresponding states, in the prescribed sequence, for uniquely identifying corresponding characters of the class when each of said storage means of a given group is set.

20. A character recognition system as recited in claim 16 wherein:

said storage means are responsive to said space state defining means to be reset in response to an output therefrom identifying the space state.

21. A character recognition system as recited in claim 16 wherein there is further provided, delay means responsive to an output from said space state defining means to produce a reset signal a predetermined time delay interval thereafter, and said storage means are responsive to said delay means to be reset by said reset signal.

22. A character recognition system as recited in claim 13 further comprising:

means responsive individually to the output of each sensor to determine whether the output condition thereof identifies the presence of a character segment in its scan path during the scanning of each character, and means for identifying an error condition in the event that no such character segment identifying output condition obtains for any given sensor throughout the duration of scanning a character.

23. A character recognition system as recited in claim 13 wherein there is further provided, means responsive to said sensors and to said space state defining means for identifying an error condition when any of said sensors fails to produce an output condition identifying a character segment in its scan path at any time between the occurrence of successive space states.

24. A character recognition system as recited in claim 13 further comprising:

means for responding to the outputs of said sensors to identify the scanning of a character segment by any of said sensors, and means responsive to said space state defining means, said sensors, and said logic recognition means for generating an error indication in response to receipt of a space state subsequent to receipt of an input condition of any sensor identifying a character segment in its path and prior to identification of a character by said logic recognition means.

25. A character recognition system as recited in claim 13 wherein said state defining means comprise a plurality of logic gates respectively associated with each of the states to be identified, each of said gates having a plurality of inputs connected to the outputs of said sensor means and enabled upon coincidence of output conditions of said sensors corresponding to the set of conditions defining the associated state.

26. A character recognition system as recited in claim 25 wherein said logic recognition means comprise a plurality of sequentially related storage means, each said storage means being associated with one of said state defining logic gates for being set in response to an output therefrom, nd each sequentially related storage means of each group thereof being enabled for setting in response to a set condition of a next preceding storage means.

27. A method of character recognition for recognizing characters embossed on a medium and utilizing a plurality of aligned electromechanical sensors individually actuatable and normally urged to a first position corresponding to the background of said medium for producing a first output condition and moved to a second position in response to engaging the segments of the embossed characters to produce a second output condition, comprising:

scanning each character in a given direction of scan with the plurality of sensors aligned transversely to the scan direction for responding to each successive, new combination of character segments presented to the transversely aligned sensors in effecting a scan of a character, and thereby defining corresponding, successive character recognition sets of output conditions of said sensors for each such character, responding to at least selected ones of said character recognition sets to define corresponding character recognition states, and to the set of conditions comprising the second output condition of all said sensors to define a space state, establishing prescribed sequences of character recognition states uniquely identifying each scanned character, responding to the space state to identify a space between successively scanned characters, and processing the succession of character recognition states defined in the scanning of each character, intermediate successive space states, for producing an output uniquely identifying the scanned character as a character of a class to be recognized.

* * * * *